United States Patent
Lee et al.

(10) Patent No.: US 8,681,608 B2
(45) Date of Patent: Mar. 25, 2014

(54) METHOD FOR ENHANCING OF CONTROLLING RADIO RESOURCES AND TRANSMITTING STATUS REPORT IN MOBILE TELECOMMUNICATIONS SYSTEM AND RECEIVER OF MOBILE TELECOMMUNICATIONS SYSTEM

(75) Inventors: Young-Dae Lee, Gyeonggi-Do (KR); Sung-Duck Chun, Gyeonggi-Do (KR); Sung-Jun Park, Gyeonggi-Do (KR); Seung-June Yi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 474 days.

(21) Appl. No.: 12/451,795

(22) PCT Filed: Jun. 18, 2008

(86) PCT No.: PCT/KR2008/003454
§ 371 (c)(1),
(2), (4) Date: Dec. 1, 2009

(87) PCT Pub. No.: WO2008/156300
PCT Pub. Date: Dec. 24, 2008

(65) Prior Publication Data
US 2010/0190504 A1   Jul. 29, 2010

Related U.S. Application Data

(60) Provisional application No. 60/944,785, filed on Jun. 18, 2007, provisional application No. 60/945,340, filed on Jun. 20, 2007.

(30) Foreign Application Priority Data

Jun. 13, 2008 (KR) ........................ 10-2008-0055960

(51) Int. Cl.
*H04L 1/00* (2006.01)
*H04J 3/24* (2006.01)
*H04L 12/28* (2006.01)
*H04W 72/00* (2009.01)

(52) U.S. Cl.
USPC ........... 370/229; 370/242; 370/349; 370/235; 370/412; 455/452.1

(58) Field of Classification Search
USPC ........ 370/229, 242, 349, 235, 412; 455/452.1
See application file for complete search history.

(56) References Cited

U.S. PATENT DOCUMENTS 6,445,917 B1   9/2002   Bark et al.
6,557,135 B1   4/2003   Balachandran et al.
(Continued)

FOREIGN PATENT DOCUMENTS

CN   1314747 A   9/2001
CN   1349360     5/2002
(Continued)

OTHER PUBLICATIONS

U.S. Appl. No. 60/976,139 (U.S. Appl. No. 12/238,810, filed Sep. 26, 2008 claims priority to this Provisional).
U.S. Appl. No. 61/019,058 (U.S. Appl. No. 12/340,033, filed Dec. 19, 2008 claims priority to this Provisional).
(Continued)

*Primary Examiner* — Christopher M Brandt
*Assistant Examiner* — Muthuswamy Manoharan
(74) *Attorney, Agent, or Firm* — McKenna Long & Aldridge, LLP

(57) ABSTRACT

Disclosed is a method for enhancing of controlling radio resource and transmitting a Status Report in a mobile telecommunications system, and a receiver of mobile telecommunications system. When any PDUs that have not been received ('missing PDUs') occur, a receiving RLC entity does not immediately request re-transmission about the 'missing PDUs'. Rather, only when missing PDUs more than a predetermined number occur, the receiving RLC entity requests the re-transmission. Accordingly, an amount of radio resources required to transmit a Status Report can be reduced.

2 Claims, 3 Drawing Sheets

(56) References Cited

U.S. PATENT DOCUMENTS

| | | |
|---|---|---|
| 6,594,240 B1 | 7/2003 | Chuah et al. |
| 6,728,918 B1 | 4/2004 | Ikeda et al. |
| 6,738,624 B1 | 5/2004 | Aksentijevic et al. |
| 6,788,944 B2 | 9/2004 | Jiang |
| 6,874,113 B2 | 3/2005 | Chao et al. |
| 6,987,985 B2 | 1/2006 | Purkayastha et al. |
| 7,009,940 B2 | 3/2006 | Vialen et al. |
| 7,180,885 B2 | 2/2007 | Terry |
| 7,227,857 B2 | 6/2007 | Kuo |
| 7,227,868 B2 | 6/2007 | Inden |
| 7,295,573 B2 | 11/2007 | Yi et al. |
| 7,450,933 B2 | 11/2008 | Kwak et al. |
| 7,525,908 B2 * | 4/2009 | Olsson et al. ................ 370/229 |
| 7,710,930 B2 | 5/2010 | Kwak |
| 8,027,321 B2 | 9/2011 | Zheng |
| 8,270,348 B2 | 9/2012 | Chun et al. |
| 2002/0001314 A1 | 1/2002 | Yi et al. |
| 2002/0009999 A1 | 1/2002 | Lee et al. |
| 2002/0024972 A1 | 2/2002 | Yi et al. |
| 2002/0114280 A1* | 8/2002 | Yi et al. .................... 370/235 |
| 2002/0122411 A1 | 9/2002 | Zimmerman et al. |
| 2003/0007490 A1 | 1/2003 | Yi et al. |
| 2003/0194992 A1 | 10/2003 | Kim et al. |
| 2004/0103435 A1 | 5/2004 | Yi et al. |
| 2004/0146019 A1 | 7/2004 | Kim et al. |
| 2004/0147236 A1 | 7/2004 | Parkvall et al. |
| 2004/0156330 A1 | 8/2004 | Yi et al. |
| 2004/0235447 A1 | 11/2004 | Gronberg et al. |
| 2005/0020260 A1 | 1/2005 | Jeong et al. |
| 2005/0039101 A1 | 2/2005 | Torsner |
| 2005/0042987 A1 | 2/2005 | Lee et al. |
| 2005/0047416 A1 | 3/2005 | Heo et al. |
| 2005/0096017 A1 | 5/2005 | Kim |
| 2005/0100048 A1* | 5/2005 | Chun et al. .................. 370/468 |
| 2005/0118992 A1 | 6/2005 | Jeong et al. |
| 2005/0164683 A1 | 7/2005 | Roberts et al. |
| 2005/0193309 A1 | 9/2005 | Grilli et al. |
| 2005/0237932 A1 | 10/2005 | Liu |
| 2005/0238051 A1 | 10/2005 | Yi et al. |
| 2005/0254467 A1 | 11/2005 | Li et al. |
| 2005/0259662 A1 | 11/2005 | Kim et al. |
| 2006/0030342 A1 | 2/2006 | Hwang et al. |
| 2006/0056441 A1 | 3/2006 | Jiang |
| 2006/0067238 A1 | 3/2006 | Olsson et al. |
| 2006/0067289 A1 | 3/2006 | Lee |
| 2006/0072503 A1 | 4/2006 | Kim et al. |
| 2006/0084389 A1 | 4/2006 | Beale et al. |
| 2006/0128312 A1 | 6/2006 | Declerck et al. |
| 2006/0142020 A1 | 6/2006 | Mueckenheim et al. |
| 2006/0154680 A1 | 7/2006 | Kroth et al. |
| 2006/0165045 A1 | 7/2006 | Kim et al. |
| 2006/0203780 A1 | 9/2006 | Terry |
| 2006/0233200 A1 | 10/2006 | Fifield et al. |
| 2006/0251027 A1 | 11/2006 | Chun et al. |
| 2006/0251105 A1 | 11/2006 | Kim et al. |
| 2006/0264179 A1 | 11/2006 | Bonneville et al. |
| 2006/0268798 A1 | 11/2006 | Kim et al. |
| 2006/0280145 A1 | 12/2006 | Revel et al. |
| 2007/0041397 A1 | 2/2007 | Hwang |
| 2007/0047493 A1 | 3/2007 | Park et al. |
| 2007/0060139 A1 | 3/2007 | Kim et al. |
| 2007/0079207 A1 | 4/2007 | Seidel et al. |
| 2007/0081468 A1 | 4/2007 | Timus |
| 2007/0081513 A1 | 4/2007 | Torsner |
| 2007/0091810 A1 | 4/2007 | Kim et al. |
| 2007/0177628 A1 | 8/2007 | Choi et al. |
| 2007/0178878 A1 | 8/2007 | Ding |
| 2007/0189205 A1 | 8/2007 | Terry et al. |
| 2007/0201397 A1 | 8/2007 | Zhang |
| 2007/0206530 A1 | 9/2007 | Lee et al. |
| 2007/0268861 A1 | 11/2007 | Diachina et al. |
| 2007/0274278 A1 | 11/2007 | Choi et al. |
| 2008/0002688 A1 | 1/2008 | Kim et al. |
| 2008/0043658 A1 | 2/2008 | Worrall |
| 2008/0043670 A1 | 2/2008 | Marinier |
| 2008/0045272 A1 | 2/2008 | Wang et al. |
| 2008/0049682 A1 | 2/2008 | Ding et al. |
| 2008/0051098 A1 | 2/2008 | Rao |
| 2008/0069108 A1 | 3/2008 | Yi et al. |
| 2008/0081598 A1 | 4/2008 | Chandra et al. |
| 2008/0182609 A1 | 7/2008 | Somasundaram et al. |
| 2008/0186936 A1 | 8/2008 | Chun |
| 2008/0186944 A1 | 8/2008 | Suzuki et al. |
| 2008/0212561 A1* | 9/2008 | Pani et al. ..................... 370/346 |
| 2008/0232396 A1 | 9/2008 | Buckley et al. |
| 2008/0233940 A1 | 9/2008 | Jen |
| 2008/0261581 A1 | 10/2008 | Cai |
| 2008/0273610 A1 | 11/2008 | Malladi et al. |
| 2008/0310395 A1 | 12/2008 | Kashima |
| 2008/0318566 A1 | 12/2008 | Chun et al. |
| 2008/0318578 A1 | 12/2008 | Worrall |
| 2009/0005058 A1 | 1/2009 | Kazmi et al. |
| 2009/0104890 A1 | 4/2009 | Wang et al. |
| 2009/0116434 A1 | 5/2009 | Lohr et al. |
| 2009/0119564 A1 | 5/2009 | Sagfors et al. |
| 2009/0156194 A1 | 6/2009 | Meylan |
| 2009/0175163 A1 | 7/2009 | Sammour et al. |
| 2009/0175253 A1 | 7/2009 | Wu et al. |
| 2009/0190480 A1 | 7/2009 | Sammour et al. |
| 2009/0259908 A1 | 10/2009 | Gollapudi |
| 2009/0305712 A1 | 12/2009 | Franceschini et al. |
| 2010/0091750 A1 | 4/2010 | Lee et al. |
| 2010/0142429 A1 | 6/2010 | Yi et al. |
| 2011/0033048 A1 | 2/2011 | Stanwood et al. |

FOREIGN PATENT DOCUMENTS

| | | |
|---|---|---|
| CN | 1643820 | 7/2003 |
| CN | 1613210 A | 5/2005 |
| CN | 1792048 A | 6/2006 |
| CN | 1938969 | 3/2007 |
| CN | 101047966 A | 10/2007 |
| CN | 1918825 | 6/2010 |
| CN | 1868157 | 7/2011 |
| EP | 1035745 | 9/2000 |
| EP | 1343267 A2 | 9/2003 |
| EP | 1508992 A2 | 2/2005 |
| EP | 1689130 A1 | 8/2006 |
| EP | 1768297 | 3/2007 |
| EP | 1796405 A1 | 6/2007 |
| EP | 2 163 006 | 3/2009 |
| JP | 6-053921 | 2/1994 |
| JP | 2010518683 | 5/2010 |
| KR | 10-2001-0045783 A | 6/2001 |
| KR | 2001-0045783 A | 6/2001 |
| KR | 10-2001-0062306 A | 7/2001 |
| KR | 2002-0004645 A | 1/2002 |
| KR | 10-2003-0060055 A | 7/2003 |
| KR | 10-2003-0087914 A | 11/2003 |
| KR | 10-2004-0034398 A | 4/2004 |
| KR | 10-2004-0039944 A | 5/2004 |
| KR | 10-2004-0072961 | 8/2004 |
| KR | 10-2005-0022988 A | 3/2005 |
| KR | 10-2005-0081836 | 8/2005 |
| KR | 10-2005-0081836 A | 8/2005 |
| KR | 10-2005-0099472 | 10/2005 |
| KR | 10-2005-0100882 A | 10/2005 |
| KR | 10-2005-0103127 A | 10/2005 |
| KR | 10-2006-0004935 A | 1/2006 |
| KR | 10-2006-0014910 | 2/2006 |
| KR | 10-2006-0029452 | 4/2006 |
| KR | 10-2006-0042858 A | 5/2006 |
| KR | 2006-0069378 A | 6/2006 |
| KR | 2006-0079784 A | 7/2006 |
| KR | 10-2006-0090191 A | 8/2006 |
| KR | 10-2006-0134058 A | 12/2006 |
| KR | 10-2007-0048552 A | 5/2007 |
| KR | 10-2007-0076374 | 7/2007 |
| WO | 01/67664 | 9/2001 |
| WO | 0245453 A1 | 6/2002 |
| WO | WO 03045103 A1 | 5/2003 |
| WO | WO 2004/042963 A1 | 5/2004 |
| WO | WO 2004/102838 A1 | 11/2004 |
| WO | 2005022814 A1 | 3/2005 |

(56) References Cited

FOREIGN PATENT DOCUMENTS

| WO | WO 2005/022812 | 3/2005 |
|---|---|---|
| WO | WO 2005-039108 A2 | 4/2005 |
| WO | WO 2005/109671 A1 | 11/2005 |
| WO | WO 2005/122441 | 12/2005 |
| WO | WO 2006/052086 A | 5/2006 |
| WO | 2006075820 A1 | 7/2006 |
| WO | WO 2006/075820 | 7/2006 |
| WO | 2006104773 A1 | 10/2006 |
| WO | WO 2007/024065 A1 | 3/2007 |
| WO | WO 2007/039023 A1 | 4/2007 |
| WO | WO 2007/045505 A1 | 4/2007 |
| WO | WO 2007/052900 A1 | 5/2007 |
| WO | WO 2007/078156 | 7/2007 |
| WO | WO 2007/078173 A1 | 7/2007 |
| WO | WO 2007/078174 | 7/2007 |
| WO | WO 2007/089797 A2 | 8/2007 |
| WO | WO 2007/126793 A2 | 11/2007 |
| WO | WO 2007/147431 A | 12/2007 |

OTHER PUBLICATIONS

LG Electronics Inc: "UE state transition in LTE_Active", R2-061002, 3GPP TSG-RAN WG2 #52; Mar. 27-31, 2006, Athens, Greece. XP-050130928.
Texas Instruments: "UL Synchronization Management and Maintenance in E-UTRA", R1-072198, 3GPP TSG-RAN WG1 #49, May 7-11, 2007 Kobe, Japan. XP050105936.
Texas Instruments: "UL Synchronization Management in LTE_Active", R1-071478, 3GPP TSG RAN WG1 #48 bis, Mar. 26-30, 2007, St. Julians, Malta. XP050105413.
Motorola: "Contention-free Intra-LTE Handover", R2-070730, 3GPP TSG-RAN WG2 #57, Feb. 12-16, 2007, St. Louis, Missouri. XP 050133763.
Ericsson: "Scheduling Request in E-Utran", R1-070471, 3GPP TSG-RAN WG2 #47bis, Jan. 15-19, 2007, Sorrento, Italy. XP50104502.
Reuven Cohen: "An improved SSCOP-like Scheme for Avoiding Unnecessary Retransmissions and Achieving Ideal Throughput", Proceedings of IEEE Infocom 1996, Conference on Computer Communications, Fifteenth Annual Joint Conference of the IEEE Computer and communications Societies, Mar. 24-28, 1996, pp. 855-862, XP010158150.
"Digital Cellular telecommunications system (Phase 2+); Functional stage 2 description of Location Serices (LCS) in GERAN (3GPP TS 43.059 version 7.3.0 Release 7); ETSI TS 143 059" ETSI Standards, LIS, Sophia Antipolis Cedex, France, vol. 3-G1, No. V7.3.0, XP014038519.
ZTE: "Redundant retransmission restraint in RLC-AM", 3GPP Draft; R2-061234, 3rd Generation Partnership Project, Mobile Competence Centre; vol. RAN WG2 no. Shanghai, China, May 3, 2006, XP050131180.
NEC: "Optimized Buffer Status Reporting" 3GPP TSG-RAN WG2 58bis Meeting; Jun. 2007, Orlando, Florida. R2-072515, XP002503220.
Catt et al: "Consideration on UL buffer reporting" 3GPP TSG RAN WG2 #55, Seoul, Korea, Oct. 9-13, 2006, R2-062934, XP002513924.
Kashima, Method and Apparatus for Providing Timing Alignment, U.S. Appl. No. 60/944,662 (provisional applications are not published).
Wu et al. Enhanced Random Access Response Formats in E-UTRAN, U.S. Appl. No. 61/006,348 (provisional applications are not published).
LG Electronics Inc., "Correction of status report coding", 3GPP TSG RAN WG2 #61, Feb. 11-15, 2008, Sorrento, Italy, R2-080969.
Alcatel-Lucent, "PDCP status report carrying LIS only", 3GPP TSG RAN WG2 #61, Jan. 14-18, 2008, Sevilla, Spain, R2-080902.
NTT DoCoMo et al: "Uplink synchronization maintenance", 3GPP Draft; R2-072014, $3^{rd}$ Generation Partnership Project (3GPP), Mobile Competence Centre; 650, Route Des Lucioles; F-06921 Sophia-Antipolis Cedex; France, vol. RAN WG2, no. Kobe, japan; May 4, 2007, XP050134889.

Ericsson, SDU Discard, R2-073230, 3GPP, Aug. 24, 2007.
Qualcomm Europe, General Corrections to RLC, R2-011701, 3GPP, Jul. 13, 2001.
LG Electronics Inc., Out-of-sequence problem in AM RLC: Discretely discarded SDUs, R2-011206, 3GPP, May 5, 2001.
3GPP TS 36.321 V8.2.0 (May 2008), $3^{rd}$ Generation Partnership Project; Technical Specification Group Radio Access Network; Evolved Universal Terrestrial Radio Access (E-UTRA) Medium Access Control (MAC) protocol specification (Release 8), Jun. 17, 2008.
3GPP TSG-RAN WG2 Meeting #67, Shenzen, China, Aug. 24-28, 2009, R2-095152.
Romain Masson: "E-UTRA RACH within the LTE system," These submitted for Masters of Engineering Research from the University of Lausanne, School of Electrical, Computer and Telecommunications Engineering, CHKTH Electrical Engineering, Feb. 3, 2006, pp. 1082, XP-002448009, Stockholm, Sweden.
LG Electronics Inc.:"R2-073043 RACH procedure," 3GPP TSG-RAN WG2 #59, Athens, Greece, No. R2073043, Aug. 19, 2007, pp. 1-3, XP-002515770.
LG Electronics Inc. "R2-080189 Discussion on random access backoff procedure," 3GPP TSG-RAN WG2 #60bis, Sevilla, Spain, No. R2080189, Jan. 14, 2008, pp. 1-4.
"$3^{rd}$ Generation Partnership Project; Technical Specification Group Radio Access Network; Evolved Universal Terrestrial Radio Access (E-UTRA) Medium Access Control (MAC) protocol specification (Release 8)," 3GPP TS 36.321 V8.0.0, vol. 36.321, No. V8.0.0, Dec. 1, 2007, pp. 1-23.
3rd Generation Partnership Project;Technical Specification Group Radio Access Network;Radio Link Control (RLC) protocol specification(Release 6), 3GPP Draft; 25322-650, 3rd Generation Partnership Project (3GPP), Mobile Competence Centre; 650, Route Des Lucioles ; F-06921 Sophia-Antipolis Cedex ; France, vol. RAN WG2, no. Cannes, France; Oct. 17, 2005, XP050129441.
Qinqing Zhang et al: "Performance of UMTS radio link control", Proceedings of IEEE International Conference on Communications—Apr. 28-May 2, 2002—New York, NY, USA, IEEE, Piscataway, NJ, USA, vol. 5, Apr. 28, 2002, pp. 3346-3350, XP010590089, DOI: 10.1109/ICC.2002.997451 ISBN: 978-0-7803-7400-3.
TSG-RAN WG2 (Sep. 11, 2007); Ericsson Meeting #60, R2-074701, "RLC Status Report Format", Jeju Island, Korea, Nov. 5-9, 2007.
3GPP TS 36.322 V8.0.0, 3rd Generation Partnership Project; Technical Specification Group Radio Access Network; Evolved Universal Terrestrial Radio Access (E-UTRA) Radio Link Control (RLC) protocol Specification, Dec. 20, 2007.
QUALCOMM Europe, L2 Improvements and Polling, 3GPP TSG-RAN WG2 Meeting #58 R2-072021, Nov. 5, 2007, p. 1-3, URL, http://www.3gpp.org/ftp/tsg_ran/WG2_RL2/TSGR2_58/Documents/R2-072021.zip.
LG Electronics Cannes, France, Jun. 27-30, 2006, Delivery of LTE System Information, 3GPP TSG-RAN WG2 ad-hoc on LTE, R2-061959.
3rd Generation Partnership Project; Technical Specification Group Radio Access Network; Radio Link Control (RLC) protocol specification (Release 7), Jun. 2007, V7.3.0, 3GPP Organizational Partners, France. XP050367795.
Universal Mobile Telecommunications System (UMTS); Radio Resource Control (RRC) Protocol Specification (EGPP TS 25.331 version 6.6.0 Release 6) (Jun. 2005).
NTT DoCoMo: "Uplink synchronization",3GPP TSG RAN WG2 #57, 12th—16th Feb. 2007; St. Louis, USA, vol. R2-070781, No. #57 Feb. 12, 2007, pp. 1-3, XP002713200, Retrieved from the Internet: URL:http://www.3gpp.org/ftp/tsg_ran/WG2_RL2/TSGR2 57/Documents/R2-070781.zip [retrieved on Sep. 18, 2013] Section 2—Discussion; figure 2.
Samsung: "MAC functions: ARQ", 3GPP Tsg-RAN2 Meeting #51, Denver, USA, vol. R2-060374, No. 51 Feb. 13, 2006, pp. 1-5, XP002488423, Retrieved from the Internet: URL:http://www.3gppl.net/ftp/ tsg_ran/WG2_RL2/TSGR2 51/Documents/R2-060374.zip [retrieved on Feb. 13, 2006] figure 1 Section 2—HARQ assisted ARQ operation.

* cited by examiner

METHOD FOR ENHANCING OF CONTROLLING RADIO RESOURCES AND TRANSMITTING STATUS REPORT IN MOBILE TELECOMMUNICATIONS SYSTEM AND RECEIVER OF MOBILE TELECOMMUNICATIONS SYSTEM

This application claims the benefit of PCT/KR2008/003454, filed on Jun. 18, 2008, along with U.S. Provisional Application Ser. Nos. 60/944,785, filed Jun. 18, 2007 and 60/945,340, filed Jun. 20, 2007 and Korean Patent Application No. 10-2008-0055960, filed Jun. 13, 2008, all of which are hereby incorporated herein by reference for all purposes in their entireties.

TECHNICAL FIELD

The present invention relates to a mobile telecommunications system, and more particularly, to a method for enhancing of controlling radio resource and transmitting a status report in an Evolved Universal Mobile Telecommunications System (E-UMTS), and a receiver of mobile telecommunications system.

BACKGROUND ART

FIG. 1 is a network structure of an LTE (Long Term Evolution) system, the related art mobile communication system. For the LTE system, which has evolved from the existing UMTS system, basic standardizations are ongoing in the 3GPP.

An LTE network can be divided into an E-UTRAN (Evolved UMTS Terrestrial Radio Access Network) and a CN (Core Network). The E-UTRAN includes a terminal (or UE (User Equipment)), a base station (eNB (Evolved NodeB), and an access gateway (aGW). The access gateway may be divided into a part that handles processing of user traffic and a part that handles control traffic. In this case, the access gateway part that processes the user traffic and the access gateway part that processes the control traffic may communicate with a new interface. One or more cells may exist in a single eNB. An interface may be used for transmitting user traffic or control traffic between eNBs. The CN may include the access gateway and a node or the like for user registration of the UE. An interface for discriminating the E-UTRAN and the CN may be used.

FIG. 2 shows an exemplary structure of a control plane of a radio interface protocol between the UE and the E-UTRAN based on the 3GPP radio access network standards. FIG. 3 shows an exemplary structure of a user plane of the radio interface protocol between the UE and the E-UTRAN based on the 3GPP radio access network standards.

The structure of the radio interface protocol between the UE and the E-UTRAN will now be described with reference to FIGS. 2 and 3.

The radio interface protocol has horizontal layers comprising a physical layer, a data link layer, and a network layer, and has vertical planes comprising a user plane (U-plane) for transmitting user data and a control plane (C-plane) for transmitting control signals. The protocol layers in FIGS. 2 and 3 can be classified into a first layer (L1), a second layer (L2), and a third layer (L3) based on three lower layers of an open system interconnection (OSI) standard model widely known in the communication system. The radio protocol layers exist as pairs between the UE and the E-UTRAN and handle a data transmission in a radio interface.

The layers of the radio protocol control plane of FIG. 2 and those of the radio protocol user plane of FIG. 3 will be described as follows.

The physical layer, the first layer, provides an information transfer service to an upper layer by using a physical channel. The physical layer is connected to an upper layer called a medium access control (MAC) layer via a transport channel. Data is transferred between the MAC layer and the physical layer via the transport channel. The transport channel is divided into a dedicated transport channel and a common channel according to whether or not a channel is shared. Between different physical layers, namely, between a physical layer of a transmitting side and that of a receiving side, data is transmitted via the physical channel.

The second layer includes various layers. First, a medium access control (MAC) layer performs mapping various logical channels to various transport channels and performs logical channel multiplexing by mapping several logical channels to a single transport channel. The MAC layer is connected an upper layer called a radio link control (RLC) layer by a logical channel. The logical channel is divided into a control channel that transmits information of the control plane and a traffic channel that transmits information of the user plane according to a type of transmitted information.

An RLC (Radio Resource Control) layer, the second layer, segments and/or concatenates data received from an upper layer to adjust the data size so as for a lower layer to suitably transmit the data to a radio interface. In addition, in order to guarantee various QoSs (Quality of Services) required by each radio bearer RB, the RLC layer provides three operational modes: a TM (Transparent Mode); a UM (Unacknowledged Mode); and an AM (Acknowledged Mode). In particular, the RLC layer (referred to as an 'AM RLC layer', hereinafter) operating in the AM performs a re-transmission function through an automatic repeat and request (ARQ) function for a reliable data transmission.

A packet data convergence protocol (PDCP) layer of the second layer performs a function called header compression that reduces the size of a header of an IP packet, which is relatively large and includes unnecessary control information, in order to effectively transmit the IP packet such as an IPv4 or IPv6 in a radio interface having a narrow bandwidth. The header compression increases a transmission efficiency between radio interfaces by allowing the head part of the data to transmit only the essential information.

The RRC layer located at the lowermost portion of the third layer is defined only in the control plane, and controls a logical channel, a transport channel and a physical channel in relation to configuration, reconfiguration, and the release of radio bearers (RBs). In this case, the RBs refer to a logical path provided by the first and second layers of the radio protocol for data transmission between the UE and the UTRAN. In general, the configuration (or establishment) of the RB refers to the process of stipulating the characteristics of a radio protocol layer and a channel required for providing a particular data service, and setting the respective detailed parameters and operational methods.

Hereinafter, the RLC layer will be explained in more detail. As aforementioned, the RLC layer operates in three modes, TM, UM, and AM. Since the RLC layer performs a simple function in the TM, only the UM and AM will be explained.

The UM RLC generates each PDU with a PDU header including a Sequence Number (SN), thereby allowing a receiving side to know which PDU has been lost while being transmitted. Accordingly, the UM RLC transmits broadcast/multicast data, or transmits real-time packet data such as voice (e.g., VoIP) of a Packet Service domain (PS domain) or streaming on a user plane. Also, on a control plane, the UM RLC transmits, to a specific terminal or specific terminal group in a cell, an RRC message requiring no response for reception acknowledgement.

Like the UM RLC, the AM RLC generates each PDU with a PDU header including a Sequence Number (SN). Differently from the UM RLC, in the AM RLC, a receiving side performs acknowledgement for PDUs transmitted from a sending side. In the AM RLC, a receiving side performs a response so that PDUs having not received can be re-transmitted by a sending side. The re-transmission function is the main characteristic of the AM RLC. An object of the AM RLC is to guarantee error-free data transmission using the re-transmission function. To this end, the AM RLC transmits non-real time packet data such as TCP/IP of PS domain in a User Plane, and transmits RRC messages requiring response of reception acknowledgement from a terminal in a cell in a Control Plane.

The UM RLC is used in a uni-directional communications system, whereas the AM RLC is used in a bi-directional communications system due to feedback from a receiving side. The UM RLC is different from the AM RLC in the aspect of structure. The UM RLC has one of a sending side and a receiving side in one RLC entity, whereas the AM RLC has both a sending side and a receiving side in one RLC entity.

The AM RLC is complicated due to a re-transmission function for data. The AM RLC is provided with a re-transmission buffer as well as a sending/receiving buffer. The AM RLC performs many functions, e.g., usage of a sending/receiving window for flow control, polling to request a Status Report from a receiving side of a peer RLC entity by a sending side, a receiving side's Status Report informing its buffer status to a sending side of a peer RLC entity, and Status PDUs to transmit status information.

In order to support the above functions, the AM RLC requires various protocol parameters, status variables, and timers.

In the AM RLC such as Status Report or Status PDUs, PDUs used to control data transfer is referred to as 'Control PDUs', and PDUs used to transfer User Data is referred to as 'Data PDUs'.

Data loss may occur on a physical channel in all mobile telecommunications systems. A data loss rate, indicating that data was not successfully transmitted to a receiving side from a sending side on a physical layer is lower in an Evolved Universal Terrestrial Radio Access Network (E-UTRAN) than in the related art systems. However, the data loss rate in the E-UTRAN is not completely 'zero'. Especially, terminals located far from a base station have a high data loss rate. Accordingly, important signaling data or TCP data required to be transmitted without error have to be managed with more special care. To this end, the aforementioned Acknowledged Mode (AM) is used.

In the AM, when a receiving side has failed to receive data, the receiving side has to rapidly inform the status to a sending side. The less time taken for the receiving side to recognize errors and to inform the errors to the sending side is, the less time taken to correct the errors is. Also, time to transmit User Data is shortened, thereby enhancing a user's satisfaction degree. Accordingly, on an RLC layer, through an RLC Status Report, the receiving side informs its buffer status to the sending side, and requests re-transmission about data having not been received.

However, if the RLC receiving side transmits a Status Report whenever any missing data is found, radio resource is wasted. The RLC Status Report is transmitted through an RLC Status PDU. Since the RLC Status PDU is also one type of RLC PDU, the RLC Status Report to be transmitted requires radio resources, which it would waste radio resources in a mobile communications system.

Accordingly, required is a mechanism allowing an RLC Status Report to be rapidly transmitted, and consuming less radio resources.

DISCLOSURE OF INVENTION

Technical Solution

Therefore, it is an object of the present invention to provide a method for configuring new L2 protocols in a Long Term Evolution (LTE) system that transmits a newly defined RLC Status Report.

To achieve these and other advantages and in accordance with the purpose of the present invention, as embodied and broadly described herein, there is provided a method for transmitting a Status Report by a receiving side in a mobile telecommunications system, comprising: receiving a threshold value related to a status report from the sending side, wherein the threshold value is decided by a sending side; (B) receiving data transmitted from the sending side and storing the data in a reception buffer; and (C) transmitting the status report to the sending side by checking a total amount of the data stored in the reception buffer, and the threshold value.

Preferably, the step of (C) includes calculating a ratio of the reception buffer usage by stored data (i.e., amount of stored data/total size of the reception buffer); and comparing the calculated ratio with the threshold value.

Preferably, the status report is transmitted to the sending side when the calculated ratio is larger than the threshold value.

Preferably, when the total amount of data stored in the reception buffer is larger than the threshold value, data that has not been received is identified by using sequence number (SN) of the data stored in the reception buffer, and the status report including information about the data that has not been received is transmitted.

Preferably, the threshold value is a predetermined value indicating a total byte of data stored in the reception buffer, or a ratio of a total byte of data stored in the reception buffer to a total byte (i.e., size) of the reception buffer, or a ratio of the number of PDUs corresponding to a total amount of data stored in the reception buffer, to a size of a reception window.

Preferably, the sending side is a network, and the receiving side is an user equipment (UE). The step of (A) is performed by a Radio Resource Control (RRC) entity of the terminal, and the steps of (B) and (C) are performed by a Radio Link Control (RLC) entity of the terminal.

According to another aspect of the present invention, there is provided a method for transmitting a status report in a mobile telecommunications system, comprising: storing Radio Link Control Protocol Data Units (RLC PDUs) out of sequence received from a sending side (eNB RLC) in a reception buffer; identifying RLC PDUs that have failed to be received when a predetermined ratio of RLC PDUs are stored in the reception buffer; and transmitting to the sending side (eNB RLC) a status report that informs the RLC PDUs that have not been received.

Preferably, the method for transmitting a status report in a mobile telecommunications system further comprises: when the RLC PDUs that have not been received are received from the sending side having received the status report, transferring, to an upper layer, the received RLC PDUs and the RLC PDUs that are previously received and stored in the reception buffer.

Preferably, the received RLC PDUs and the RLC PDUs that are previously received and stored in the reception buffer are in sequence.

Preferably, the predetermined ratio is a ratio of the reception buffer usage by stored data (i.e., a total size of the reception buffer), and the predetermined ratio is decided by the sending side (eNB RRC) and is transmitted to the receiving side.

Preferably, the sending side is a base station, and the receiving side is an user equipment (UE).

According to still another aspect of the present invention, there is provided a method for transmitting a status report in a mobile telecommunications system, comprising: receiving, from a sending side, a threshold value associated with status report transmission; counting, by a receiving window, the number of missing Protocol Data Units (PDUs) among PDUs transmitted from the sending side; and transmitting a status report to the sending side when the number of the counted missing PDUs reaches the threshold value.

Preferably, the threshold value is decided by the sending side, and indicates an allowable number of missing PDUs.

To achieve these and other advantages and in accordance with the purpose of the present invention, as embodied and broadly described herein, there is also provided a method for transmitting status report in a mobile telecommunications system, comprising: receiving, from a sending side, a threshold value associated with status report transmission; receiving PDUs transmitted from the sending side, and storing the PDUs in a reception buffer; counting the number of PDUs stored in the reception buffer; and transmitting a status report to the sending side when the number of the counted PDUs reaches the threshold value.

Preferably, the threshold value is decided by the sending side, and indicates an allowable number of stored PDUs.

MODE FOR THE INVENTION

Reference will now be made in detail to the preferred embodiments of the present invention, examples of which are illustrated in the accompanying drawings.

The present invention is applied to a mobile telecommunications system, and more particularly, to an Evolved Universal Mobile Telecommunications System (E-UMTS) that has evolved from UMTS. However, the present invention may be applied to all mobile telecommunications systems and communication protocols to which technical features of the present invention are broadly applied.

An object of the present invention is to reduce an amount of radio resource, by transmitting a Status Report by a receiving RLC only when 'missing PDUs' is more than a predetermined number, rather than by immediately transmitting a Status Report when any missing PDU occurs.

To achieve the object, many methods may be considered.

Figure 1:
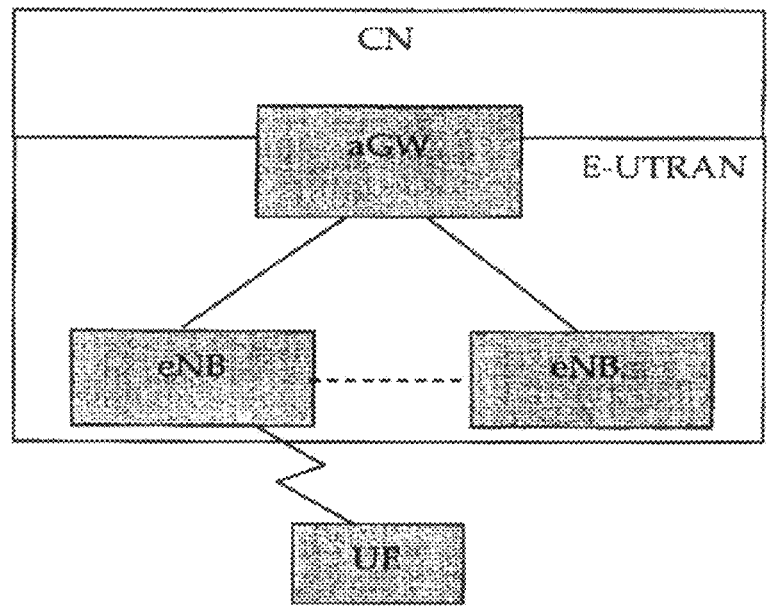
FIG. 1 shows a network structure of a Long Term Evolution (LTE) in a mobile telecommunications system in accordance with the related art.
Figure 2:
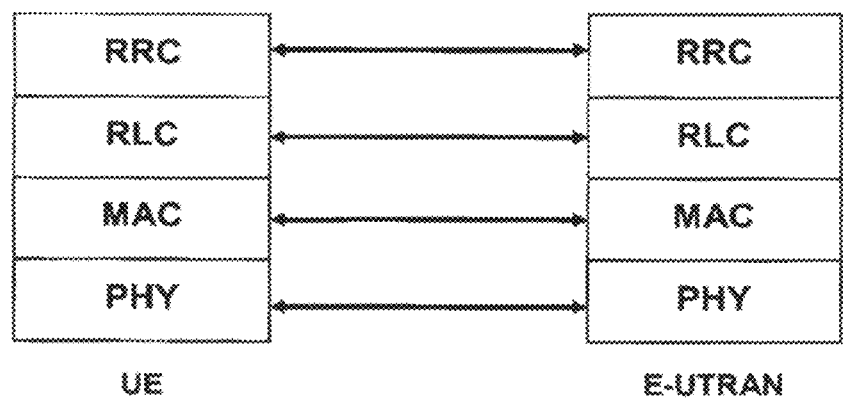
FIG. 2 shows a control plane architecture of a radio interface protocol between a terminal and an Evolved-UMTS Terrestrial Radio Access Network (UTRAN) based on 3GPP radio access network standards.
Figure 3:
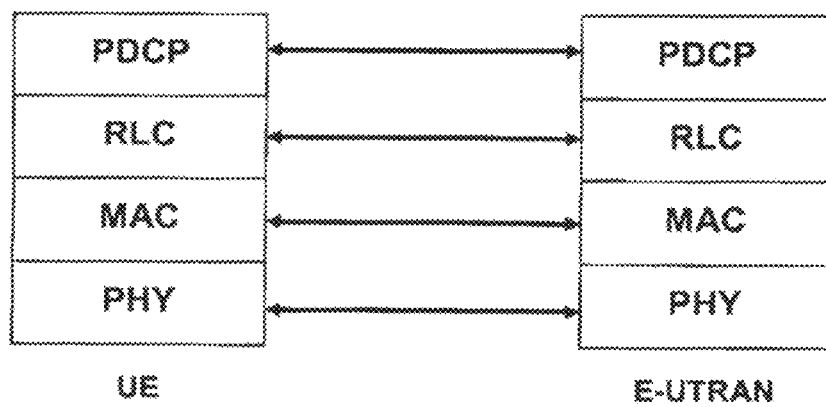
FIG. 3 shows a user plane architecture of the radio interface protocol between a terminal and an Evolved-UMTS Terrestrial Radio Access Network (UTRAN) based on 3GPP radio access network standards.
Figure 4:
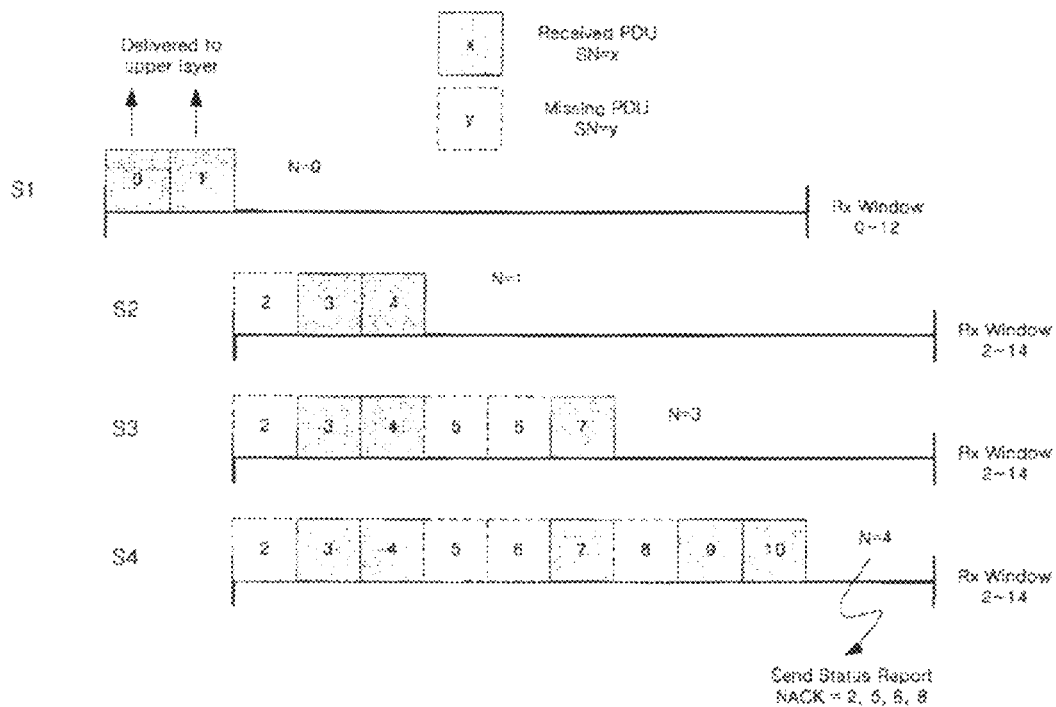
FIG. 4 is a block diagram showing a method for transmitting a Status Report when the number of 'Missing PDUs' is more than a predetermined number according to a first embodiment of the present invention.

FIG. 4 is a block diagram showing a method for transmitting a Status Report when the number of 'missing PDUs' is more than a predetermined number according to a first embodiment of the present invention.

Figure 5:
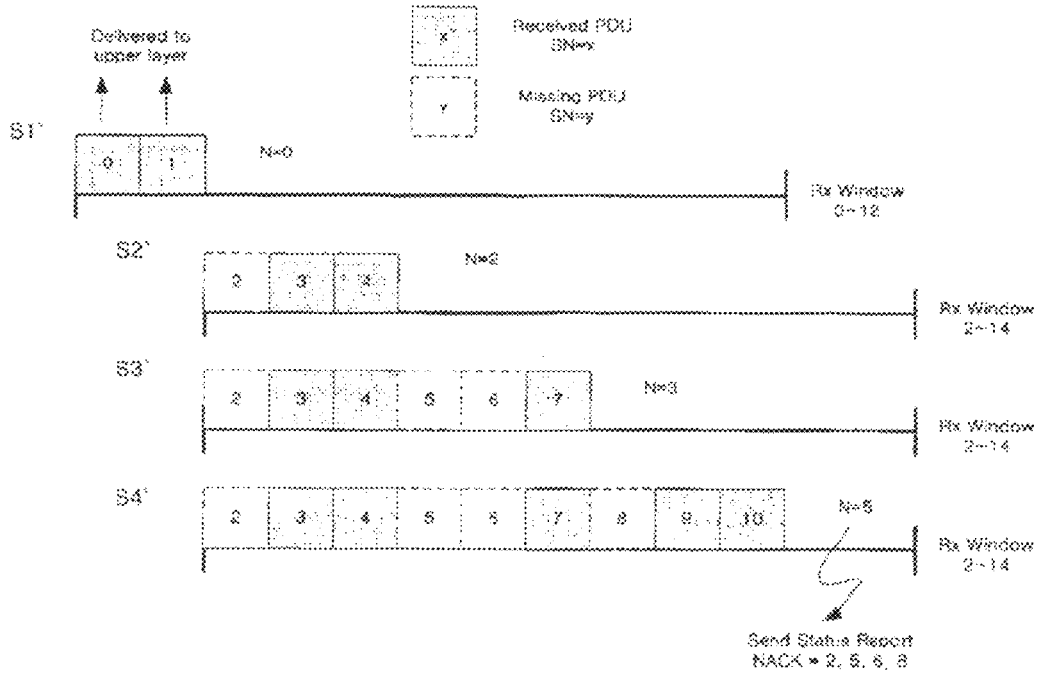
FIG. 5 is a block diagram showing a method for transmitting a Status Report when the number of 'RLC PDUs' stored in a reception buffer is more than a predetermined number according to a second embodiment of the present invention.

FIG. 5 is a block diagram showing a method for transmitting a Status Report when the number of 'RLC PDUs' stored in a reception buffer is more than a predetermined number according to a second embodiment of the present invention.

Figure 6:
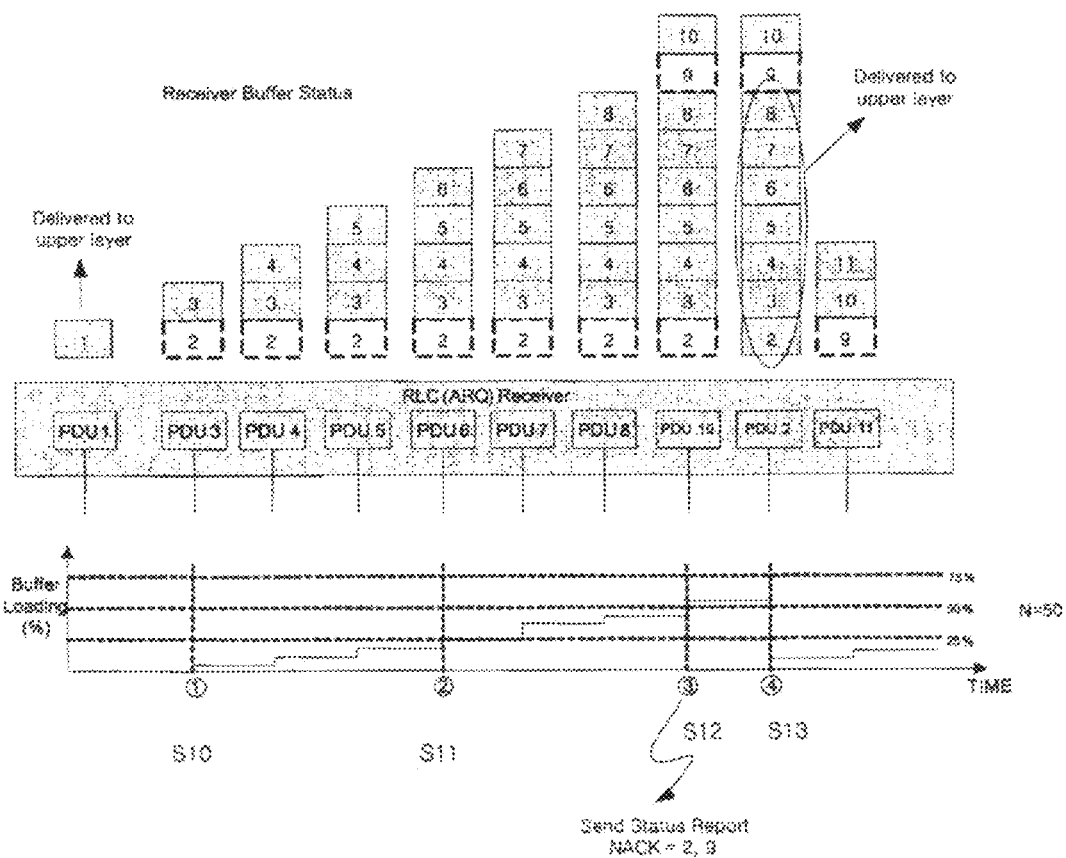
FIG. 6 is a block diagram showing a method for transmitting a Status Report when a ratio of the reception buffer usage by stored 'RLC PDUs' is more than a predetermined ratio according to a third embodiment of the present invention.

FIG. 6 is a block diagram showing a method for transmitting a Status Report when a ratio of the reception buffer usage by stored 'RLC PDUs' is more than a predetermined ratio according to a third embodiment of the present invention.

The first embodiment of the present invention will be explained with reference to FIG. 4.

In the first embodiment of the present invention, when a total number of 'missing PDUs' counted by a receiving side whenever any missing PDU occurs is more than a predetermined value such as 'N' (may be referred to as threshold value, default value, set value, count value, etc.), the receiving side transmits a Status Report. When a Sequence Number (SN) of a PDU being currently received is non-continuous with the previously received PDU, PDUs between the PDU being currently received and the previously received PDU are determined as 'missing PDUs'. The concept of the first embodiment shown in FIG. 4 may be somewhat different according to application methods, and may be implemented in various manners.

Operation between a network and a terminal (UE) for implementing the first embodiment of FIG. 4 will be explained as follows.

eNB RRC decides the value N, and informs it to UE RRC. Here, the value N (corresponding to a predetermined threshold value or reference value) is a total number of 'missing PDUs' used by a receiving side (corresponding to a UE, and will be referred to as 'Receiving RLC entity'). The eNB refers to as an entity of a network, a base station. The eNB RRC is an RRC layer of the base station, and the UE RRC is an RRC layer of the UE.

The UE RRC configures UE RLC with "Detection of N missing PDUs" trigger for Status Reporting, and informs the UE RLC of the value N.

Upon reception of an RLC PDU, the Receiving RLC entity shall operate as follows.

(1) If the RLC PDU is received in sequence, the RLC PDU is delivered to an upper layer, and then all the following in-sequence RLC PDUs are delivered to an upper layer. If there is any remaining PDU in the reception buffer, a lower edge of the reception window is set to the first missing PDU in the reception buffer. Otherwise, if there is no remaining PDU in the reception buffer, the lower edge of the reception window is set to the next PDU expected to be received.

(2) Otherwise, if the RLC PDU is received out of sequence, the RLC PDU is stored in the reception buffer with the position indicated by its RLC sequence number (SN). If the sequence number of the received RLC PDU has the highest sequence number in the reception window, the number of missing PDUS from the lower edge of the reception window up to the received RLC PDU is counted. If the number of missing PDUs reaches N, a Status Report is transmitted to the Sending RLC entity.

The total number of missing PDUs is counted whenever any missing PDU is received. However, as aforementioned, the total number of missing PDUs can be also obtained by performing counting only when a received RLC PDU has the highest sequence number. The number of missing PDUs is counted within the reception window. Here, PDUs subsequent to a PDU having the highest SN may be PDUs being currently transmitted, thereby not being counted as missing PDUs. That is, the number of missing PDUs is counted among PDUs between a PDU corresponding to a starting point of the reception window, and a PDU having the highest SN.

Hereinafter, the first embodiment of the present invention will be explained in more detail with reference to FIG. 4. In the first embodiment of FIG. 4, the value of N is 4. That is, the Receiving RLC entity transmits a Status Report to the Sending RLC entity when the number of missing PDU is more than 4, rather than transmits whenever any missing PDU occurs.

Referring to FIG. 4, the reception window is set to have a size of 12, and an initial position of 0~12. The Receiving RLC entity normally receives the 0th PDU (hereinafter, will be referred to as 'PDU 0') and 1st PDU (hereinafter, will be referred to as 'PDU 1') from the Sending RLC entity, and then delivers them to a Receiving upper layer (S1). Here, no missing PDU occurred. Since the Receiving RLC entity didn't count any missing PDU, the value N is '0'.

Since the 'PDU 0' and the 'PDU 1' have been already delivered to an upper layer, no RLC PDU remains in the reception buffer. Therefore, the reception window is set to a sequence number (i.e., 2) of next 'PDU 2' expected to be received (i.e., Rx Window 2~14).

Then, as shown in the reception window, the 'PDU 2' is a missing PDU, and 'PDU 3' and 'PDU 4' are successfully received to be stored in the reception buffer (S2). Here, since the Receiving RLC entity counts the missing PDUs, the number of 'missing PDUs' is F. Even if any missing PDU (i.e., 'PDU 2') occurs in the preferred embodiment, a Status Report is not immediately transmitted to the Sending RLC entity.

'PDU 5' and 'PDU 6' fail to be received (that is, they are 'missing PDUs'), and 'PDU 7' is successfully received (S3). Here, the Receiving RLC entity (i.e., receiving side) counts the total number of missing PDUs. As a result of an accumulated counting of missing PDUs, the number of 'missing PDUs' is '3'.

Then, PDUs are sequentially received (PDU 8~10 in FIG. 4). 'PDU 8' is a missing PDU, and 'PDU 9' and 'PDU 10' are successfully received. Here, the Receiving RLC entity counts the number of missing PDUs among PDUs received up to now. As a result of an accumulated counting of missing PDUs by the Receiving RLC entity, the number of 'missing PDUs' is '4'. At this time, the Receiving RLC entity transmits a Status Report to the Sending RLC entity, thereby reporting that 'PDUs 2, 5, 6 and 8' are missing PDUs (S4). As aforementioned, in the first embodiment, a Status Report is not immediately transmitted to the Sending RLC entity whenever any missing PDU occurs, but a Status Report including information about missing PDUs is transmitted to the Sending RLC entity when the number of missing PDUs reaches 4 that is equal to N. Accordingly, an amount of radio resource required when a Status Report is transmitted can be saved.

FIG. 5 is a block diagram showing a method for transmitting a Status Report when the number of 'RLC PDUs' stored in the reception buffer is more than a predetermined number according to a second embodiment of the present invention.

Once receiving PDUs, the Receiving RLC entity re-assemblies Service Data Units (SDUs) included in the received PDUs thus to deliver them to an upper layer. Here, the PDUs are delivered to the upper layer in sequence occurring no missing PDU. When any missing PDUs occur, even if PDUs subsequent to the missing PDUs are successfully received, the missing PDUs have to be received so that SDUs included therein can be firstly delivered to an upper layer. Then, PDUs successfully received after the missing PDUs are delivered to an upper layer. More concretely, if any missing PDU occurs, PDUs after the missing PDU are stored in the reception buffer.

In the second embodiment of the present invention, a Status Report is transmitted when the number of PDUs successfully received to be stored in the reception buffer is more than a predetermined number (e.g., a predetermined threshold value or reference value), rather than when any missing PDU occurs. That is, in the second embodiment, a Status Report is transmitted by counting the number of PDUs stored in the reception buffer, which is different from the first embodiment. The second embodiment will be explained in more detail as follows.

eNB RRC decides the value N, and informs it to UE RRC. Here, the value N indicates a total number of 'stored PDUs' used by a Receiving RLC entity (corresponding to a UE) whenever any stored PDU occurs. The eNB refers to as an entity of a network, a base station. The eNB RRC is an RRC layer of the base station, and the UE RRC is an RRC layer of the UE.

The UE RRC configures UE RLC with "Detection of N stored PDUs" trigger for Status Reporting, and informs the UE RLC of the value N.

Upon reception of an RLC PDU, the Receiving RLC entity shall operate as follows.

(1) If the RLC PDU is received in sequence, the RLC PDU is delivered to an upper layer, and then all the following in-sequence RLC PDUs are delivered to an upper layer. If there is any remaining PDU in the reception buffer, a lower edge of the reception window is set to the first missing PDU in the reception buffer. Otherwise, if there is no remaining PDU in the reception buffer, the lower edge of the reception window is set to the next PDU expected to be received.

(2) Otherwise, if the RLC PDU is received out of sequence, the RLC PDU is stored in the reception buffer with the position indicated by its RLC sequence number (SN). Then, the number of stored PDUs from the lower edge of the reception window up to the received RLC PDU in the reception buffer is counted. Here, the number of stored PDUs in the reception widow is not counted, but the number of RLC PDUs stored in the reception buffer is counted. If the number of stored PDUs reaches N, a Status Report is transmitted to the Sending RLC entity.

In the second embodiment of FIG. 5, the number of PDUs stored in the reception buffer is counted whenever any PDU is received to be stored in the reception buffer.

In the second embodiment of FIG. 5, the number of PDUs stored in the reception buffer is counted, so that a Status Report can be transmitted to the Sending RLC entity more efficiently than in the first embodiment of FIG. 4.

FIG. 6 is a block diagram showing a method for transmitting a Status Report when a ratio of the reception buffer usage by stored 'RLC PDUs' is more than a predetermined ratio according to a third embodiment of the present invention.

A size of an RLC PDU may be varied in a Long Term Evolution (LTE). Since the RLC PDU has a variable size, transmitting a Status Report to the Sending RLC entity by counting the number of PDUs may not be effective in the aspect of managing the reception buffer. In the third embodiment of the present invention, when a ratio of the reception buffer usage by stored PDUs due to missing PDUs is more than N %, a Status Report is transmitted to the Sending RLC entity. Here, the N % may be decided with consideration of situation and condition of a network, a capability of the Receiving RLC entity, etc.

Hereinafter, the third embodiment of FIG. 6 will be explained.

eNB RRC decides the value N, and informs it to UE RRC. Here, the value N (corresponding to a predetermined threshold value or reference value) may indicate a ratio (%) of the reception buffer usage by PDUs stored after being received by the Receiving RLC entity. The value N may indicate a size of PDUs stored in the reception buffer (e.g., variable-sized reception buffer or fixed-sized buffer), for example, a total byte of PDUs stored therein. The value N may indicate a ratio (e.g., %) of a size of the reception window to the reception buffer usage by stored PDUs.

The eNB refers to as an entity of a network, a base station. The eNB RRC is an RRC layer of the base station, and the UE RRC is an RRC layer of the UE.

The UE RRC configures UE RLC with "Stored PDUs reach N % of reception buffer" trigger for Status Reporting, and informs the UE RLC of the value N.

Upon reception of an RLC PDU, the Receiving RLC entity shall operate as follows.

(1) If the RLC PDU is received in sequence, the RLC PDU is delivered to an upper layer, and then all the following in-sequence RLC PDUs are delivered to an upper layer. If there is any remaining PDU in the reception buffer, a lower edge of the reception window is set to the first missing PDU in the reception buffer. Otherwise, if there is no remaining PDU in the reception buffer, the lower edge of the reception window is set to the next PDU expected to be received.

(2) Otherwise, if the RLC PDU is received out of sequence, the RLC PDU is stored in the reception buffer with the position indicated by its RLC sequence number (SN). Then, a ratio of the reception buffer usage by stored RLC PDUs (i.e., amount of stored RLC PDUs/total size of the reception buffer) is checked. If the ratio reaches N %, a Status Report is transmitted to the Sending RLC entity.

The check for the ratio of the reception buffer usage by stored RLC PDUs is performed whenever any RLC PDU is received to be stored in the reception buffer.

In the third embodiment of FIG. 6, the value N is set to be 50(%). Accordingly, when a total amount of PDUs stored in the reception buffer (i.e., received PDUs) reach more than 50% of the size of the reception buffer, a Status Report is transmitted to the Sending RLC entity.

Referring to a time axis in FIG. 6, the first 'PDU 1' is successfully received to be stored in the reception buffer. Then, the 'PDU 1' is transmitted to an upper layer.

When PDUs are sequentially received up to 'PDU 3', only the 'PDU 3' is successfully received whereas 'PDU 2' is a missing PDU (which corresponds to ① on the time axis in FIG. 6) (S10). Here, since the amount of PDUs stored in the reception buffer does not exceed '50%' (N=50), the Receiving RLC entity does not transmit a Status Report to the Sending RLC entity.

When time corresponds to ② in FIG. 6, the Receiving RLC entity receives PDUs up to 'PDU 6' to store them in the reception buffer (S11). Here, the amount of PDUs stored in the reception buffer does not exceed '50%', either.

When time corresponds to ③ in FIG. 6, the Receiving RLC entity receives PDUs up to 'PDU 10' to store them in the reception buffer (S12). Up to ③, 'PDU 2' and 'PDU 9 ' are missing PDUs. Here, the amount of PDUs stored in the reception buffer exceeds '50%' (N=50). Accordingly, the Receiving RLC entity transmits a Status Report to the Sending RLC entity, thereby requesting the missing 'PDU 2' and 'PDU 9 ' to be re-transmitted (S12). At time point ④ in FIG. 6, when only 'PDU 2' is received from the Sending RLC entity, the Receiving RLC entity transmits PDUs '2~8 ' stored in the reception buffer to an upper layer (S13). Then, at time point when 'PDU 11' was received, 'PDU 10' and 'PDU 11' rather than the missing 'PDU 9 ' are stored in the reception buffer.

In the third embodiment of FIG. 6, when an amount of PDUs stored in the reception buffer is more than a predetermined amount (e.g., N=50%), a Status Report including information about missing PDUs is transmitted. Accordingly, when a size of PDUs or a size of the reception buffer is variable, radio resources can be more efficiently managed by using the third embodiment.

Hereinafter, a receiver of mobile telecommunications system according to the present invention will be explained.

The receiver is an apparatus composed of hardware, software, a module including software, etc. to implement preferred embodiments of FIGS. 4 to 6.

The receiver of the present invention may be referred to as an 'entity', or a 'server', or a 'terminal' (UE).

The receiver of the present invention includes a reception buffer configured to store PDUs transmitted from a Sending RLC entity; and a processor configured to check whether PDUs transmitted from the Sending RLC entity are missing PDUs by using sequential numbers (SN), configured to check whether PDUs stored in the reception buffer have reached a threshold value (e.g., the value N in FIG. 6), and configured to decide the threshold value.

When an amount of PDUs stored in the reception buffer reaches a threshold value, the processor checks (detects) missing PDUs by using SN of PDUs stored in the reception buffer. Then, the processor transmits a Status Report including information about the missing PDUs to the Sending RLC entity (i.e., network).

The receiver of the present invention may be differently implemented according to functions of the processor.

In order to implement the preferred embodiments of FIGS. 4 and 5, the receiver comprises a reception buffer configured to store PDUs transmitted from a Sending RLC entity; a counter configured to count the number of missing PDUs in the reception window, or the number of PDUs stored in the reception buffer; and a processor configured to check whether the number of missing PDUs (or stored PDUs) counted by the counter reaches a threshold value (e.g., the value N in FIG. 4 or FIG. 5), and configured to decide the threshold value.

When the number of missing PDUs (or stored PDUs) counted by the counter reaches the threshold value, the processor transmits a Status Report including information about the missing PDUs to the Sending RLC entity.

The processor may be referred to as a controller or a module. The counter may be implemented as a component of the processor, or may be implemented independently.

The method for enhancing of controlling radio resource and transmitting a Status Report in a mobile telecommunications system can be implemented by software, hardware, or combination thereof. For instance, the method of the present invention may be stored in a storage medium (e.g., memory inside a terminal, flash memory, hard disc, etc.), or may be implemented as codes or commands inside a software program that can be executed by a processor (e.g., microprocessor inside a terminal).

The present invention has the following effects.

When any data is not received, request for re-transmission is not immediately performed. Rather, when a predetermined amount of data having not been received occurs, request for re-transmission is performed at one time. Accordingly, an amount of radio resources required to request re-transmission is reduced.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A method for transmitting a status report by a user equipment (UE) in a mobile telecommunications system, comprising:
   (A) receiving, by a radio resource control (RRC) entity of the UE, a threshold value related to a status report from a network, wherein the threshold value is decided by the network;
   (B) receiving, by a radio link control (RLC) entity of the UE, data transmitted from the network and storing the data in a reception buffer of the UE; and
   (C) determining, by the radio link control (RLC) entity of the UE, whether to transmit the status report to the network by checking a total amount of the data stored in the reception buffer of the UE and the threshold value,
   wherein the threshold value is a predetermined value indicating a ratio of the total byte size of data stored in the reception buffer of the UE to a total byte size of the reception buffer of the UE,
   wherein the total amount of the data stored in the reception buffer of the UE is expressed as a calculated ratio of the total amount of the data stored in the reception buffer of the UE to a total size of the reception buffer of the UE,
   wherein the status report is transmitted to the network if the calculated ratio is equal to or larger than the threshold value.

2. The method of claim 1, further comprising:
   comparing the total amount of the data stored in the reception buffer of the UE to the threshold value;
   wherein when the total amount of the data stored in the reception buffer is equal to or larger than the threshold value, data that has not been received is identified by using sequence number (SN) of the data stored in the reception buffer of the UE; and
   including information indicating the data that has not been received in the status report.

* * * * *